US012743908B2

(12) United States Patent
Zhou

(10) Patent No.: US 12,743,908 B2
(45) Date of Patent: Sep. 22, 2026

(54) DRIVING DATA COLLECTION METHOD AND APPARATUS

(71) Applicant: Yinwang Intelligent Technologies Co., Ltd., Shenzhen (CN)

(72) Inventor: Wei Zhou, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 232 days.

(21) Appl. No.: 17/956,541

(22) Filed: Sep. 29, 2022

(65) Prior Publication Data

US 2023/0015205 A1 Jan. 19, 2023

Related U.S. Application Data

(63) Continuation of application No. PCT/CN2020/082637, filed on Mar. 31, 2020.

(51) Int. Cl.

*G07C 5/00* (2006.01)
*G07C 5/08* (2006.01)
*H04W 36/08* (2009.01)

(52) U.S. Cl.

CPC .......... *G07C 5/008* (2013.01); *G07C 5/0808* (2013.01); *G07C 5/085* (2013.01); *H04W 36/08* (2013.01)

(58) Field of Classification Search

None

See application file for complete search history.

(56) References Cited

U.S. PATENT DOCUMENTS

| | | | | |
|---|---|---|---|---|
| 2018/0288502 | A1* | 10/2018 | Higuchi | H04Q 9/00 |
| 2018/0365909 | A1* | 12/2018 | Cheng | H04Q 9/00 |
| 2019/0266264 | A1 | 8/2019 | Michalakis | |
| 2020/0041995 | A1 | 2/2020 | Quillin | |
| 2020/0077292 | A1* | 3/2020 | Tsuyunashi | H04W 4/44 |
| 2020/0364953 | A1* | 11/2020 | Simoudis | G06N 20/00 |
| 2021/0149394 | A1* | 5/2021 | Li | H04L 43/024 |

FOREIGN PATENT DOCUMENTS

| | | | |
|---|---|---|---|
| CN | 107547578 | A | 1/2018 |
| CN | 108674338 | A | 10/2018 |
| CN | 109557904 | A | 4/2019 |
| CN | 109857002 | A | 6/2019 |
| CN | 110398960 | A | 11/2019 |
| CN | 110473310 | A | 11/2019 |
| CN | 110682866 | A | 1/2020 |
| CN | 110688943 | A | 1/2020 |
| CN | 110780608 | A | 2/2020 |
| CN | 110789533 | A | 2/2020 |
| CN | 110824912 | A | 2/2020 |
| CN | 110853393 | A | 2/2020 |
| CN | 110893858 | A | 3/2020 |
| CN | 110901638 | A | 3/2020 |
| IN | 109993234 | A | 7/2019 |
| JP | 2020038595 | A | 3/2020 |

* cited by examiner

*Primary Examiner* — Davin Seol

(74) *Attorney, Agent, or Firm* — WOMBLE BOND DICKINSON (US) LLP

(57) ABSTRACT

A driving data collection method is disclosed, including: obtaining driving scenario requirement information (S203); determining at least one sensor on a vehicle based on the driving scenario requirement information (S204); and then, sending driving data collected by the at least one sensor to a network side device (S206).

9 Claims, 4 Drawing Sheets

DRIVING DATA COLLECTION METHOD AND APPARATUS

CROSS-REFERENCE TO RELATED APPLICATIONS

This application is a continuation of International Application No. PCT/CN2020/082637, filed on Mar. 31, 2020, the disclosure of which is hereby incorporated by reference in its entirety.

TECHNICAL FIELD

This application relates to the field of intelligent connected vehicle technologies, and in particular, to a driving data collection method and apparatus.

BACKGROUND

In an existing Internet of Vehicles system, a vehicle side device may obtain driving data such as environment information, vehicle status information, and action information, to implement self-driving or assisted driving, or may report the driving data to a server in a wired and/or wireless manner to train an artificial intelligence algorithm for self-driving or intelligent driving, so as to improve an intelligent driving level of the vehicle.

However, an existing driving data collection method is usually performed in a full data collection manner, that is, all collected data is reported to a server. Therefore, a large amount of data needs to be reported, and the reported full collected driving data may include invalid data irrelevant to a training purpose or a large amount of duplicate data. Consequently, it takes a relatively long time to collect and report driving data, and efficiency is low.

SUMMARY

Embodiments of this application provide a driving data collection method and apparatus, to resolve a problem that a large amount of data is reported when a full data collection manner is used, thereby improving efficiency of driving data collection and reporting.

To achieve the foregoing objective, this application uses the following technical solutions.

According to a first aspect, a driving data collection method is provided, and the method is applied to a vehicle. The method includes: obtaining driving scenario requirement information; determining at least one sensor on the vehicle based on the driving scenario requirement information; and constructing a target data set, where data in the target data set is driving data collected by the at least one sensor.

Based on the driving data collection method according to the first aspect, the vehicle may choose, based on the driving scenario requirement information, to report the driving data collected by the at least one sensor. For example, the vehicle may choose, based on the driving scenario requirement information, to report partial driving data collected by in-vehicle sensors, so that the vehicle can be prevented from collecting and reporting all driving data collected by all in-vehicle sensors in a full data collection manner. This can reduce a data volume of driving data that needs to be collected and reported, thereby improving efficiency of driving data collection and reporting.

In one embodiment, the constructing a target data set includes: determining, based on the driving scenario requirement information, partial data of driving data collected by the at least one sensor; and constructing the target data set based on the partial data. In this way, a data volume that needs to be transmitted can be further reduced, thereby further improving data collection efficiency.

In one embodiment, the target data set may be sent to a network side device.

In another embodiment, the target data set may be stored in a removable storage medium. Further, the removable storage medium storing the target data set may be connected to the network side device, so that the network side device uses the target data set collected by a vehicle end.

In one embodiment, the obtaining driving scenario requirement information may include: The driving scenario requirement information is received from the network side device, that is, the vehicle may collect driving data based on the driving scenario requirement information customized by the network side device. This can prevent the vehicle from collecting and reporting redundant driving data for the network side, to reduce collection and reporting of invalid driving data, thereby further improving driving data collection efficiency.

In one embodiment, before the driving scenario requirement information is received from the network side device, the driving data collection method according to the first aspect may further include: sending sensing capability information of the vehicle to the network side device. The sensing capability information is used by the network side device to determine the driving scenario requirement information. In other words, the network side device can customize the driving scenario requirement information for the vehicle based on the sensing capability information of the vehicle, to prevent a problem that the vehicle cannot complete a data collecting task because the vehicle does not support the driving scenario requirement information. This can reduce exchange between the vehicle and the network side device, thereby improving reliability of the determined driving scenario requirement information and data collection efficiency.

In another embodiment, the obtaining driving scenario requirement information may include: reading driving scenario requirement information prestored in the vehicle, to reduce information exchange between the vehicle and the network side device, thereby improving data collection efficiency.

In one embodiment, a tag related to the driving scenario requirement information is added to the target data set. For example, before the sending, to the network side device, the driving data collected by the at least one sensor, the driving data collection method according to the first aspect may further include: A tag is added to the driving data based on a driving scenario requirement, so that the network side device recognizes a driving scenario corresponding to the driving data, to simplify a driving data processing procedure of the network side device, thereby improving data processing efficiency.

According to a second aspect, a driving data collection method is provided, and the method is applied to a network side device. The method includes: sending driving scenario requirement information to a vehicle, where the driving scenario requirement information is used by the vehicle to determine at least one sensor on the vehicle. Then, driving data collected by the at least one sensor is obtained. That the driving data collected by the at least one sensor is obtained may be receiving, from the vehicle, the driving data collected by the at least one sensor, or may be reading, from a memory, the driving data collected by the at least one sensor.

In one embodiment, the driving scenario requirement information is further used to determine partial data of driving data collected by the at least one sensor. Correspondingly, that the driving data collected by the at least one sensor is obtained may include: obtaining the partial data.

In one embodiment, before the sending driving scenario requirement information to a vehicle, the method according to the second aspect may further include: receiving sensing capability information of the vehicle from the vehicle, and determining the driving scenario requirement information based on the sensing capability information.

In one embodiment, the driving data may further include a tag related to the driving scenario requirement information.

In addition, for a technical effect of the driving data collection method according to the second aspect, refer to the technical effect of the driving data collection method according to the first aspect. Details are not described herein again.

According to a third aspect, a driving data collection apparatus is provided. The apparatus is applied to a vehicle, and the apparatus may be the vehicle or a device in the vehicle. The apparatus includes an obtaining module and a processing module. The obtaining module is configured to obtain driving scenario requirement information. The processing module is configured to determine at least one sensor on the vehicle based on the driving scenario requirement information, and is further configured to construct a target data set, and data in the target data set is driving data collected by the at least one sensor.

In one embodiment, that the processing module is configured to construct a target data set specifically includes: The processing module determines, based on the driving scenario requirement information, partial data of driving data collected by the at least one sensor, and constructs the target data set based on the partial data.

In one embodiment, the apparatus further includes a sending module, configured to send the target data set to a network side device.

In one embodiment, the processing module is further configured to store the target data set in a removable storage medium.

In one embodiment, that the obtaining module is configured to obtain driving scenario requirement information may include: The obtaining module is configured to receive the driving scenario requirement information from the network side device. In other words, the obtaining module according to the third aspect may be a receiving module.

In one embodiment, the apparatus further includes a sending module, and the sending module is configured to: before the driving scenario requirement information is received from the network side device, send sensing capability information of the vehicle to the network side device. Specifically, the sending module is further configured to: before the driving scenario requirement information is received from the network side device, send the sensing capability information of the vehicle to the network side device. The sensing capability information is used by the network side device to determine the driving scenario requirement information.

In another embodiment, that the obtaining module is configured to obtain driving scenario requirement information may include: The obtaining module is configured to read driving scenario requirement information prestored in the vehicle. In other words, the obtaining module according to the third aspect may alternatively be a module having a processing function. In this case, the obtaining module may be integrated with the processing module, or may be disposed independently. This is not specifically limited in this application.

In one embodiment, the processing module is further configured to add a tag related to the driving scenario requirement information to the target data set. For example, the processing module is further configured to: before the sending module sends the driving data to the network side device, add a tag to the driving data based on a driving scenario requirement.

In one embodiment, when the obtaining module in the third aspect is a receiving module, the receiving module and the sending module may be disposed independently, or may be integrated together, for example, integrated into one transceiver module. When disposed independently, the sending module is configured to send, by the driving data collection apparatus according to the third aspect, a signal to another driving data collection apparatus, for example, another driving data collection apparatus or the network side device. The receiving module is configured to receive, by the driving data collection apparatus according to the third aspect, a signal from the another driving data collection apparatus, for example, another driving data collection apparatus or the network side device.

In one embodiment, the driving data collection apparatus according to the third aspect may further include a storage module, and the storage module stores a program or instructions. When the processing module executes the program or the instructions, the driving data collection apparatus according to the third aspect may perform the operations performed by the vehicle side device in the driving data collection method according to the first aspect.

It should be noted that the driving data collection apparatus according to the third aspect may be a vehicle, or an in-vehicle terminal, an in-vehicle module, or an in-vehicle unit that may be disposed in a vehicle, or may be a chip (system) or another part or component that may be disposed in a vehicle, an in-vehicle terminal, tan in-vehicle module, or an in-vehicle unit. This is not limited in this application.

In addition, for a technical effect of the driving data collection apparatus according to the third aspect, refer to the technical effect of the driving data collection method according to the first aspect. Details are not described herein again.

According to a fourth aspect, a driving data collection apparatus is provided, and the apparatus is applied to a network side device. The apparatus includes a sending module and an obtaining module. The sending module is configured to send driving scenario requirement information to a vehicle, and the driving scenario requirement information is used by the vehicle to determine at least one sensor on the vehicle. The obtaining module is configured to obtain driving data collected by the at least one sensor. During specific implementation, the obtaining module may be a receiving module, and obtaining the driving data collected by the at least one sensor is represented as receiving, from the vehicle, the driving data collected by the at least one sensor. Alternatively, the obtaining module may be a reading module, and obtaining the driving data collected by the at least one sensor is represented as reading, from a memory, the driving data collected by the at least one sensor.

In one embodiment, the driving scenario requirement information is further used to determine partial data of driving data collected by the at least one sensor. Correspondingly, that the apparatus includes a receiving module, and the receiving module is configured to receive, from the vehicle, the driving data collected by the at least one sensor may include: The receiving module is configured to receive the partial data from the vehicle.

In one embodiment, the driving data collection apparatus according to the fourth aspect further includes a processing module. The receiving module is further configured to receive sensing capability information of the vehicle from the vehicle. Specifically, the receiving module is further configured to receive the sensing capability information of the vehicle from the vehicle before the driving scenario requirement information is sent to the vehicle. Correspondingly, the processing module is configured to determine the driving scenario requirement information based on the sensing capability information.

In one embodiment, the driving data may further include a tag related to the driving scenario requirement information.

In one embodiment, the sending module and the receiving module according to the fourth aspect may be disposed separately, or may be integrated together, for example, may be integrated into one transceiver module. This is not specifically limited in this application.

In one embodiment, the driving data collection apparatus according to the fourth aspect may further include a storage module, and the storage module stores a program or instructions. When the processing module executes the program or the instructions, the driving data collection apparatus according to the fourth aspect may perform the operations performed by the network side device in the driving data collection method according to the second aspect.

It should be noted that the driving data collection apparatus according to the fourth aspect may be a network side device such as a server, or may be a chip (system) or another part or component that can be disposed in the network side device. This is not limited in this application.

In addition, for a technical effect of the driving data collection apparatus according to the fourth aspect, refer to the technical effect of the driving data collection method according to the first aspect. Details are not described herein again.

According to a fifth aspect, a driving data collection apparatus is provided, and the apparatus is applied to a vehicle or a network side device. The apparatus includes a processor, where the processor is coupled to a memory, the memory is configured to store a computer program or instructions, and the processor is configured to execute the computer program or the instructions, so that the apparatus performs operations performed by the vehicle side device or operations performed by the network side device in the driving data collection method according to any one of the possible implementations of the first aspect to the second aspect.

In one embodiment, the driving data collection apparatus according to the fifth aspect may further include a transceiver. The transceiver may be a transceiver circuit or an input/output port. The transceiver may be used by the driving data collection apparatus to communicate with another driving data collection apparatus.

It should be noted that the driving data collection apparatus according to the fifth aspect may be a vehicle, or a chip (system), an in-vehicle terminal, an in-vehicle module, an in-vehicle unit, or another part or component that can be disposed in a vehicle, or may be a network side device, or a chip (system), or another part or component that can be disposed in a network side device. This is not limited in this application.

In addition, for a technical effect of the driving data collection apparatus according to the fifth aspect, refer to the technical effect of the driving data collection method according to the first aspect. Details are not described herein again.

According to a sixth aspect, a vehicle is provided. The vehicle includes the driving data collection apparatus according to any one of the possible implementations of the third aspect or the fifth aspect.

According to a seventh aspect, a network side device is provided. The network side device includes the driving data collection apparatus according to any one of the possible implementations of the fourth aspect or the fifth aspect.

According to an eighth aspect, a driving data collection system is provided. The system includes a vehicle or a vehicle side device, and a network side device.

According to a ninth aspect, a computer readable storage medium is provided, including computer instructions. When the computer instructions are run by a processor, the driving data collection apparatus is enabled to perform the driving data collection method according to any one of the possible implementations of the first aspect and the second aspect.

According to a tenth aspect, a computer program product is provided. When the computer program product runs on a processor, the data verification apparatus is enabled to perform the driving data collection method according to any one of the possible implementations of the first aspect and the second aspect.

DESCRIPTION OF EMBODIMENTS

The following describes technical solutions of this application with reference to accompanying drawings.

The technical solutions in embodiments of this application may be applied to various driving data collection systems, for example, a vehicle to everything (V2X) communications system, a device-to-device (D2D) communications system, and an Internet of Vehicles communications system. The driving data collection system may be a driving data collection system based on one or more of the following communications standards: a 4th generation (4G) mobile communications system, for example, a long term evolution (LTE) system, a 5th generation (5G) mobile communications system, for example, a new radio (NR) system, and a future mobile communications system, for example, a 6th generation (6G) mobile communications system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompany drawings. In addition, a combination of these solutions may be used.

In addition, in embodiments of this application, terms such as "example" and "for example" are used to represent giving an example, an illustration, or a description. Any embodiment or design scheme described as an "example" in this application should not be explained as being more preferred or having more advantages than another embodiment or design scheme. Exactly, the word "example" is used to present a concept in a specific manner.

In embodiments of this application, terms "information", "signal", "message", "channel", and "signaling" may sometimes be interchangeably used. It should be noted that meanings expressed by the terms are consistent when differences of the terms are not emphasized. Terms "of", "corresponding or relevant", and "corresponding" may sometimes be interchangeably used. It should be noted that meanings expressed by the terms are consistent when differences of the terms are not emphasized.

In embodiments of this application, sometimes a subscript, for example, $W_1$, may be written in an incorrect form, for example, W1. Expressed meanings are consistent when differences are not emphasized.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Figure 1:
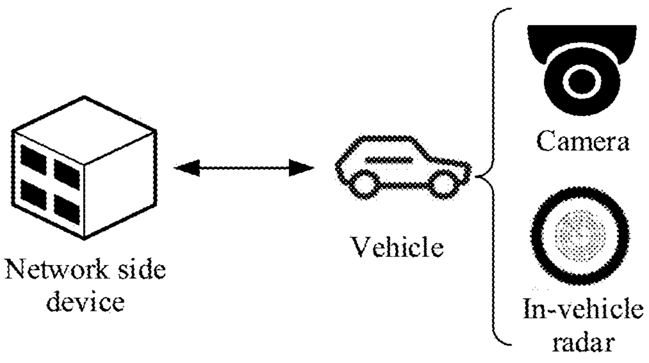
FIG. 1 is a schematic diagram of an architecture of a driving data collection system according to an embodiment of this application.

For example, FIG. 1 is a schematic diagram of an architecture of a driving data collection system to which a driving data collection method provided in an embodiment of this application is applied. For ease of understanding embodiments of this application, the driving data collection system shown in FIG. 1 is first used as an example to describe in detail a driving data collection system applicable to embodiments of this application. It should be noted that the solutions in embodiments of this application may also be applied to another driving data collection system, and a corresponding name may also be replaced with a name of a corresponding function in the another driving data collection system.

As shown in FIG. 1, the driving data collection system includes a vehicle and a network side device.

The network side device is a device that is located on a network side of the driving data collection system and that has a wired or wireless transceiver function, or a chip (system) or another part or component that can be disposed on the network side device. The network side device includes but is not limited to: a server or an access point (AP) in the driving data collection system, such as a roadside unit (RSU), an evolved Node B (eNB), a radio network controller (RNC), a Node B (NB), a base station controller (BSC), a base transceiver station (BTS), a baseband unit (BBU), a wireless relay node, a wireless backhaul node, a transmission and reception point (TRP or transmission point (TP)), and the like, or may be a gNB in a 5G system, for example, a new radio (NR) system, a transmission and reception point (TRP or TP), or one or a group of (including a plurality of antenna panels) antenna panels of a base station in the 5G system, or may be a network node forming a gNB or a transmission point, for example, a baseband unit (BBU) or a distributed unit (DU).

The vehicle is a vehicle that can access the driving data collection system and has a wired or wireless transceiver function, or an in-vehicle terminal, an in-vehicle module, an in-vehicle unit, a chip (system), or another part or component that can be disposed on the vehicle. The vehicle may also be referred to as a user apparatus, an access terminal, a subscriber unit, a subscriber station, a mobile station, a mobile station, a remote station, a remote terminal, a mobile device, a user terminal, a terminal, a wireless communication device, or a user agent. The vehicle in this embodiment of this application may be a wireless terminal in self-driving, a wireless terminal in transportation safety, a wireless terminal in a smart city, an in-vehicle terminal, an RSU having a terminal function, or the like.

As shown in FIG. 1, the vehicle may be provided with at least one sensor, for example, an in-vehicle radar (such as a millimeter-wave radar, an infrared radar, a laser radar, or a Doppler radar), a light amount sensor, a rainfall sensor, an audio and video sensor (such as a camera or an event data recorder), a vehicle posture sensor (such as a gyroscope), a speed sensor (such as a Doppler radar), an inertial measurement unit (IMU), or the like.

It should be noted that the driving data collection method provided in this embodiment of this application is applicable to communication between the vehicle and the network side device shown in FIG. 1. For specific implementation, refer to the following method embodiment. Details are not described herein again.

It should be understood that FIG. 1 is merely a simplified schematic diagram used as an example for ease of understanding. The driving data collection system may further include another network side device and/or another vehicle not shown in FIG. 1.

Figure 2:
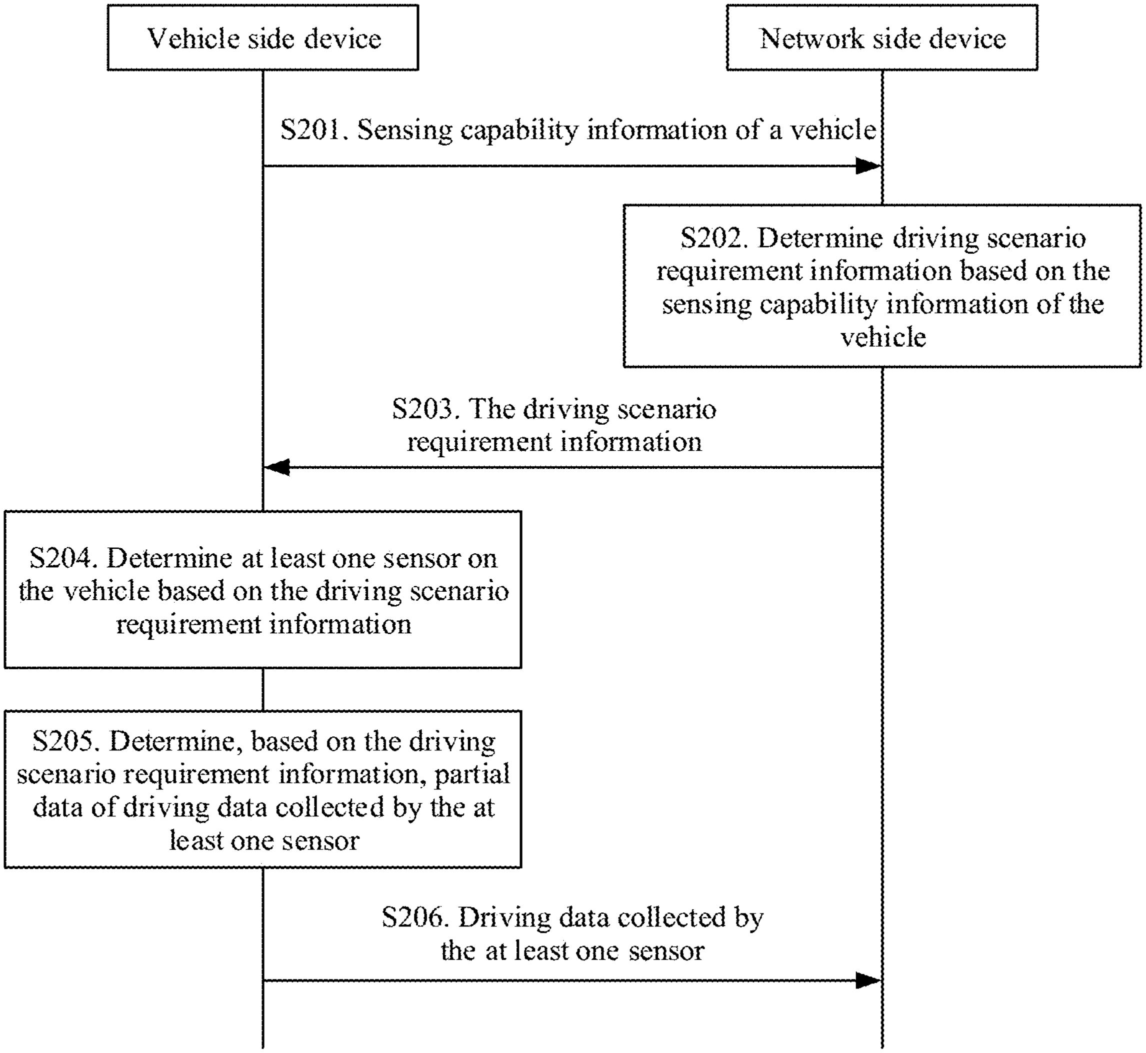
FIG. 2 is a first schematic flowchart of a driving data collection method according to an embodiment of this application.
Figure 3:
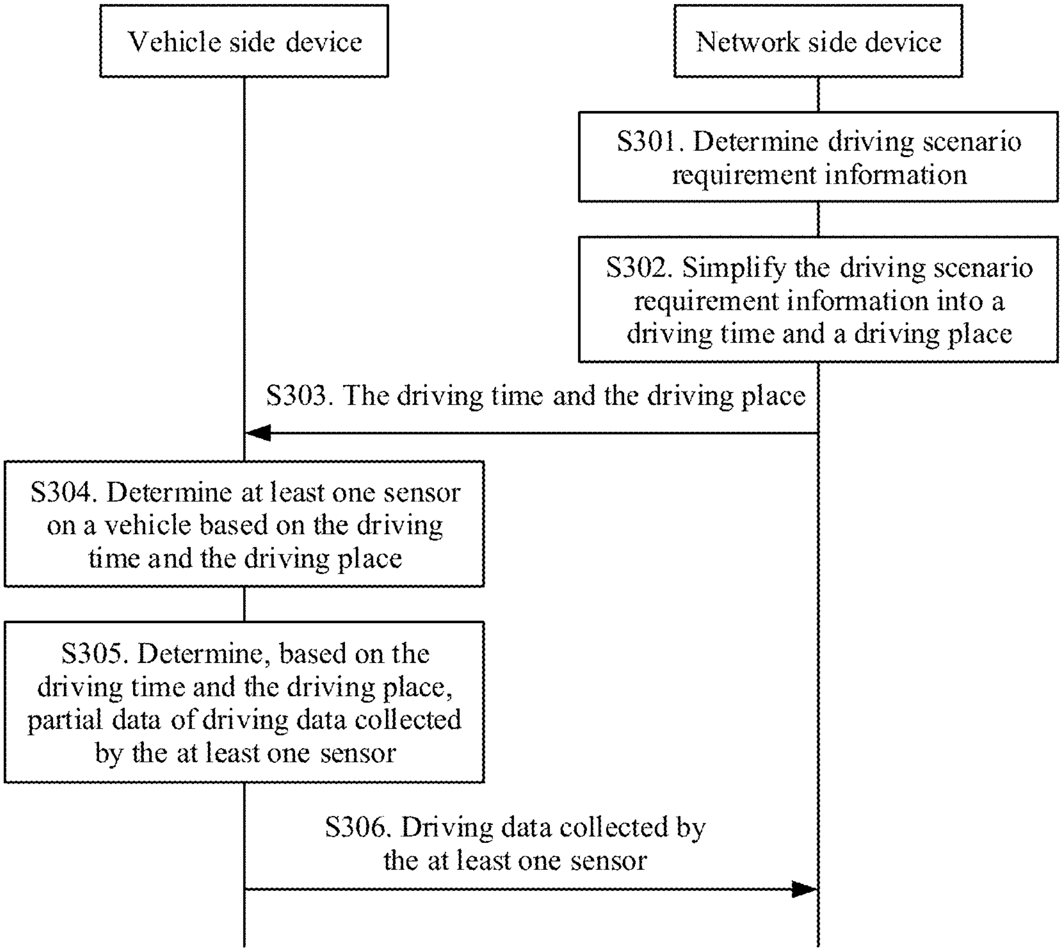
FIG. 3 is a second schematic flowchart of a driving data collection method according to an embodiment of this application.
Figure 4:
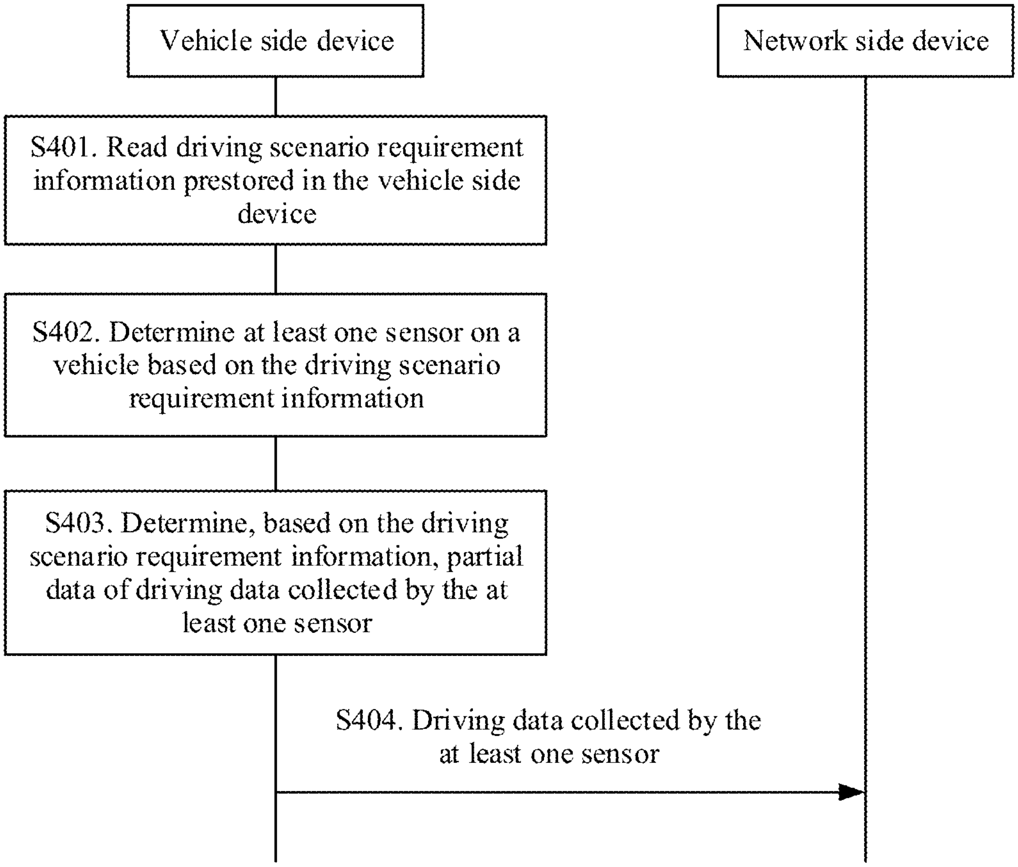
FIG. 4 is a third schematic flowchart of a driving data collection method according to an embodiment of this application.

The following specifically describes the driving data collection method provided in embodiments of this application with reference to FIG. 2 to FIG. 4. The driving data collection method shown in any one of FIG. 2 to FIG. 4 is applicable to communication between a vehicle or a vehicle side device and a network side device in the driving data collection system shown in FIG. 1. The vehicle side device is an in-vehicle terminal, an in-vehicle module, an in-vehicle unit, a chip (system), or another part or component that can be disposed in the vehicle. The network side device may include a network device such as a cloud server, a training server, or a navigation server, or a chip (system) or another part or component that may be disposed in the foregoing network device. The following uses a vehicle side device and a network side device as examples to describe the driving data collection method provided in embodiments of this application.

For example, FIG. 2 is a first schematic flowchart of a driving data collection method according to an embodiment of this application. As shown in FIG. 2, the driving data collection method includes the following operations.

S201. A vehicle side device sends sensing capability information of a vehicle to a network side device. Correspondingly, the network side device receives the sensing capability information of the vehicle from the vehicle side device.

For example, the sensing capability information of the vehicle includes sensing capability information of an in-vehicle sensor of the vehicle. The sensing capability information of the vehicle may include whether the vehicle supports audio and video signal collection, whether the vehicle supports speed data collection, whether the vehicle supports vehicle posture information collection, and the like, and may be used by the network side device to determine driving scenario requirement information. For specific implementation, refer to the following S202. Details are not described herein again.

In one embodiment, before S201 is performed, the method shown in FIG. 2 may further include: The network side device sends a sensing capability information obtaining request to the vehicle side device. Correspondingly, the vehicle side device receives the sensing capability information obtaining request from the network side device. The sensing capability information obtaining request is used to obtain the sensing capability information of the vehicle. In other words, the vehicle side device may report the sensing capability information of the vehicle to the network side device based on a request of the network side device.

In one embodiment, the vehicle side device may actively report the sensing capability information of the vehicle to the network side device. For example, after the vehicle side device is powered on and accesses the network side device, the vehicle side device may actively report the sensing capability information of the vehicle to the network side device. For another example, when being handed over from a source network side device to a target network side device, the vehicle side device may actively report the sensing capability information of the vehicle to the target network side device.

In one embodiment, the network side device may obtain the sensing capability information of the vehicle in another manner. For example, the network side device may obtain sensing capability information of a vehicle type from a vehicle manufacturer. For example, in a process in which the vehicle moves from a coverage area of a source network side device to a coverage area of a target network side device, the source network side device such as a source base station may send the sensing capability information of the vehicle to the target network side device such as a target base station, for example, by using a handover request message or by using another X2 interface message or Xn interface message after the handover is completed. The source network side device may send the sensing capability information of the vehicle based on a request of the target network side device, or may actively send the sensing capability information of the vehicle to the target network side device. This is not specifically limited in this embodiment of this application.

It should be noted that the network side device may obtain the sensing capability information of the vehicle from the vehicle side device, the source access network device, another network side device, a vehicle manufacturer, or the like in any one or more of the foregoing manners. A specific implementation in which the network side device obtains the sensing capability information of the vehicle is not limited in this embodiment of this application.

S202. The network side device determines the driving scenario requirement information based on the sensing capability information.

For example, the driving scenario requirement information is used to indicate a configuration parameter of a driving scenario, for example, road information, vehicle information, or environment information. The road information may include a highway, an urban road, a country road, a mountain road, a closed campus, a corner case, or the like. The vehicle information may include a speed, an acceleration, turn, U-turn, uphill, downhill, or the like. The environment information may include weather (sunny day, rainy day, snowy day, sandstorm, or haze), light intensity (daytime, night, or tunnel), or the like.

In one embodiment, the network side device may customize the driving scenario requirement information based on the sensing capability information of the vehicle. For example, if no infrared sensor is disposed on the vehicle, that is, the vehicle may not support night vision signal collection, the driving scenario requirement information does not include night. For another example, if the vehicle does not have a rainfall sensor, that is, the vehicle may not have a capability of distinguishing between a sunny day and a rainy day, the driving scenario requirement information does not include the sunny day and the rainy day.

In another embodiment, the network side device may select, based on the sensing capability information of the vehicle, a vehicle that can execute a driving data collection task. For example, if the driving scenario requirement information includes a rainy day, the network side device may select a vehicle on which a rainfall sensor is disposed. For another example, if the driving scenario requirement information includes daytime, the network side device may select a vehicle on which a light amount sensor is disposed.

In this way, a problem that the data collection task cannot be completed because the vehicle does not have a corresponding sensing capability can be avoided regardless of whether the network side device customizes the driving scenario requirement information based on the sensing capability information of the vehicle, or selects a vehicle that can support a driving data collection task corresponding to the driving scenario requirement information. In this way, interaction between the vehicle side device and the network side device can be reduced, thereby improving driving data collection efficiency.

In one embodiment, the network side device may further determine the driving scenario requirement information by considering one or more other factors, such as a driving scenario, a vehicle driving algorithm, and a vehicle test requirement, to further improve accuracy of determining the driving scenario requirement information, thereby further improving driving data collection efficiency.

The driving scenario may be a single scenario, for example, a highway or daytime, or may be a scenario combination including a plurality of scenarios, for example, may be highway+rainy day, rural road+vehicle speed less than 60 km/h (kilometers per hour), closed campus+vehicle speed less than 60 km/h, urban road+vehicle speed greater than 30 km/h, or sunny day+abnormal scenario. This is not specifically limited in this embodiment of this application.

The following separately describes driving scenario requirement information for a single scenario and driving scenario requirement information for a scenario combination.

In one embodiment, the driving scenario requirement information may be a driving data collection parameter or a driving data collection parameter combination for the single driving scenario. The driving scenario requirement information is in a one-to-one correspondence with the single driving scenario. Correspondingly, S202 may be specifically implemented as follows: The vehicle side device reports, to the network side device, one or more single driving scenarios identified by the vehicle side device by using the in-vehicle sensor. Correspondingly, the network side device uses, as driving scenario requirement information corresponding to a current driving data collection task, a union set of driving data collection parameters or driving data collection parameter combinations respectively corresponding to the one or more driving scenarios reported by the vehicle side device.

For example, the vehicle side device reports only one single scenario: a highway, and a driving data collection parameter corresponding to the single scenario highway is a vehicle speed>80 km/h. In this case, the network side device may use the driving data collection parameter {vehicle speed>80 km/h} corresponding to the single scenario as the driving scenario requirement information corresponding to the current driving data collection task of the vehicle. For another example, the vehicle side device reports two single scenarios in total: daytime and a highway. A driving data collection parameter corresponding to the single scenario daytime is: light amount>5 lux (lighting unit), and a driving data collection parameter corresponding to the highway in the single scenario is a vehicle speed>80 km/h. In this case, the network side device may use a union of the driving data collection parameters respectively corresponding to the two single scenarios, that is, {light amount>5 lux, vehicle speed>80 km/h}, as the driving scenario requirement information corresponding to the current driving data collection task of the vehicle.

In other words, an operation of determining the driving scenario requirement information based on one or more single driving scenarios may be performed by the network side device. In this way, the vehicle side device only needs to collect and report driving data based on the driving scenario requirement information determined by the network side device. This can reduce operation complexity of the vehicle side device, thereby further improving driving data collection efficiency.

In another embodiment, the driving scenario requirement information may be a driving data collection parameter or a driving data collection parameter combination for a scenario combination including a plurality of driving scenarios. Correspondingly, for a driving data collection task, a driving data collection parameter or a driving data collection parameter combination corresponding to a driving scenario combination may be selected based on an actual driving data collection requirement as current driving scenario requirement information.

For example, the vehicle side device reports one scenario combination in total: daytime+highway, and a driving data collection parameter combination corresponding to the scenario combination daytime+highway is {light amount>5 lux, vehicle speed>80 km/h}. In this case, the network side device may determine the driving data collection parameter combination {light amount>5 lux, vehicle speed>80 km/h} corresponding to the scenario combination as driving scenario requirement information corresponding to a current driving data collection task of the vehicle. For another example, the vehicle side device reports one scenario combination in total: moderate rain+urban road, and a driving data collection parameter combination corresponding to the scenario combination moderate rain+urban road is: {25 mm>quantized rainfall (24-hour rainfall)>10 mm, vehicle speed<50 km/h}. In this case, the network side device may determine the driving data collection parameter combination {25 mm>quantized rainfall (24-hour rainfall)>10 mm, and a vehicle speed<50 km/h} corresponding to the scenario combination as driving scenario requirement information corresponding to a current driving data collection task of the vehicle.

Similarly, for a vehicle platoon scenario including a plurality of vehicles, a corresponding driving data collection parameter combination may also be selected based on a driving scenario combination, and the network side device sends the corresponding driving data collection parameter combination to the plurality of vehicles in the vehicle platoon.

It should be noted that the vehicle side device may alternatively not report a current driving scenario or scenario combination. Specifically, the network side device may determine and send, to the vehicle side device, driving data collection parameters or driving data collection parameter combinations respectively corresponding to a plurality of single driving scenarios, or driving data collection parameters or driving data collection parameter combinations respectively corresponding to a plurality of scenario combinations. Correspondingly, after identifying one or more current single driving scenarios or scenario combinations, the vehicle side device may determine driving scenario requirement information corresponding to the current driving scenario. In other words, the operation of determining driving scenario requirement information based on a current driving scenario may alternatively be completed by the vehicle side device. For a specific implementation, refer to the foregoing operation of the network side device.

In one embodiment, the driving scenario requirement information may be determined by the network side device based on an actual training requirement of a vehicle driving algorithm, for example, an artificial intelligence algorithm used for self-driving, unmanned driving, assisted driving, or intelligent driving, or a vehicle test requirement. Specifically, a driving scenario (combination) may be determined based on an actual training requirement or test requirement, and driving scenario requirement information or a vehicle may be determined based on the driving scenario (combination).

In this way, the vehicle may collect the driving data based on the driving scenario requirement information customized by the network side device, so that a case in which the vehicle side device reports redundant driving data for the network side device can be avoided, and reporting of invalid driving data can be reduced, thereby further improving driving data collection efficiency.

It should be noted that, in a process of performing S202, the sensing capability information of the vehicle may not be considered, but candidate driving scenario requirement information corresponding to each of a plurality of single scenarios, or a plurality of groups of candidate driving scenario requirement information respectively corresponding to a plurality of scenario combinations, is or are determined based on other factors such as a vehicle driving algorithm and a vehicle test requirement. After the following S203 is performed, in S204, the vehicle side device may determine, based on a current driving scenario and a sensing capability of the vehicle, whether a driving data collection task can be executed. If the driving data collection task can be executed, the vehicle side device may determine driving scenario requirement information actually used for the current driving data collection task, and completes the driving data collection task, that is, performs the following S204 to S206.

In one embodiment, the driving scenario requirement information may be configured by using an input/output interface of the network side device, for example, a human machine interface (HMI) or a command line, and is stored in storage space of the network side device in a form of a configuration file, an executable script, or a spreadsheet.

S203. The network side device sends the driving scenario requirement information to the vehicle side device. Correspondingly, the vehicle side device receives the driving scenario requirement information from the network side device.

Specifically, the network side device may send the driving scenario requirement information to the vehicle side device in a wired or wireless manner. Correspondingly, the vehicle side device may receive the driving scenario requirement information from the network side device in a wired or wireless manner. For details, refer to an existing implementation. Details are not described again in this embodiment of this application.

S204. The vehicle side device determines at least one sensor on the vehicle based on the driving scenario requirement information.

Specifically, the vehicle side device may determine sensing capability information of the vehicle for determining the driving scenario requirement information, and determine the at least one sensor on the vehicle based on the sensing capability information of the vehicle.

For example, if the driving scenario information includes daytime, the at least one sensor may include a sensor that can collect a video signal or an optical signal, such as a camera, an event data recorder, or a light amount sensor. For another example, if the driving scenario information includes night, the at least one sensor may include a millimeter-wave radar and an infrared radar. For another example, if the driving scenario information includes a speed or an acceleration, the at least one sensor may include a speed sensor, an acceleration sensor, and a Doppler radar. For another example, if the driving scenario information includes one or more of uphill, downhill, and turning, the at least one sensor may include a gyroscope.

It should be noted that when the driving scenario information corresponds to a plurality of scenarios or a scenario combination, the at least one sensor may include a set of sensors corresponding to each scenario of the plurality of scenarios or the scenario combination.

S205. The vehicle side device determines, based on the driving scenario requirement information, partial data in driving data collected by the at least one sensor, and constructs a target data set based on the partial data.

For example, if the driving scenario requirement information relates to a scenario in which a vehicle speed is greater than 100 km/h, the vehicle side device determines, based on a sensing result of a speed sensor or a Doppler radar, a time period in which the vehicle speed is greater than 100 km/h. In addition, partial data that meets the foregoing time period and that is in all driving data collected by another sensor (for example, the camera) determined in operation S204 is further selected for use by the network side device.

For another example, if the driving scenario requirement information relates to a scenario such as an uphill scenario, a downhill scenario, or a turning scenario, the vehicle side device determines, based on a sensing result of a gyroscope, a time period in which the vehicle is in an uphill scenario, a downhill scenario, or a turning scenario. In addition, partial data that meets the foregoing time period and that is in all driving data collected by another sensor (for example, the camera) determined in operation S204 is further selected for use by the network side device. In this way, a data volume of driving data that needs to be reported can be further reduced, thereby further improving data collection efficiency.

For another example, if the driving scenario requirement information relates to a rainy day scenario, a time period in which the vehicle is in a rainy day driving state may be determined by using a rainfall sensor, and partial data that meets the foregoing time period and that is in all driving data collected by another sensor (for example, the camera) determined in operation S204 is further selected for use by the network side device. It should be understood that intelligent analysis in terms of computer vision may be further performed on an image or video data collected by the camera sensor, to determine which of the image or video data collected by the camera is collected on a rainy day, so that the video or image data collected on the rainy day is used as the partial data.

In a case of a repeated driving data scenario, for a specified scenario or a scenario combination, an upper limit of a reported data volume may be set, to avoid repeated reporting of a large amount of collected driving data of a same type. For example, if it takes three hours to collect data in the rainy day scenario, reporting of the collected driving data is stopped when a data collection time in the rainy day scenario exceeds three hours. For another example, if a specified reporting data volume threshold is 1000 gigabytes (GB), when the reported data volume exceeds 1000 GB, the collected driving data is no longer reported.

In one embodiment, the driving data that is collected by the at least one sensor and that is sent to the network side device may be driving data to which a tag related to the driving scenario requirement information is added. Specifically, the driving data collection method shown in FIG. 2 may further include: The vehicle adds a tag to the driving data based on a driving scenario requirement.

For example, if the driving scenario is highway+rainy day, a <highway, rainy day> tag may be attached to the driving data. For another example, if the driving scenario is rural road+medium speed, a <rural road, medium speed> tag may be attached to the driving data. For another example, if the driving scenario is urban road+low speed, a <urban road, low speed> tag may be attached to the driving data.

In other words, the driving data may further include a tag related to the driving scenario requirement information, so that the network side device identifies a driving scenario corresponding to the driving data. This simplifies a driving data processing procedure of the network side device, thereby improving data processing efficiency.

Further, corresponding target type tags may be further attached to target detection requirements related to different driving data. The target type may include a vehicle type, a pedestrian, a traffic sign, and the like. The vehicle type may be one of the following: a car, a bus, a motorcycle, and a truck. The traffic signs may include: a lane line (a solid line or a dotted line), a straight-through or a turning sign, a speed limit sign, a traffic signal light, a traffic police command gesture, an isolation belt, an isolation bar, a deceleration belt, a street lamp, an intersection type (a T-shaped intersection, a crossroad, or a roundabout)

S206. The vehicle side device sends, to the network side device, driving data collected by the at least one sensor. Correspondingly, the network side device receives, from the vehicle side device, the driving data collected by the at least one sensor.

Specifically, the vehicle side device may send, to the network side device in a wired or wireless manner, the driving data collected by the at least one sensor. Correspondingly, the network side device may receive, from the vehicle side device in a wired or wireless manner, the driving data collected by the at least one sensor. The wired manner may be specifically implemented as follows: The vehicle side device may store, in storage space of the vehicle-side device, driving data that needs to be reported, for example, may store the driving data in a hard disk of the vehicle side device. When the vehicle side device is connected to the network side device in the wired manner, the vehicle side device may report the driving data that needs to be reported to the network side device. Alternatively, the network side device may read, from the hard disk of the vehicle side device, the driving data that needs to be reported. A specific implementation in which the vehicle side device reports the driving data to the network side device is not limited in this embodiment of this application.

In one embodiment, if S205 is not performed, the vehicle side device may send, to the network side device, all of the driving data collected by the at least one sensor. In other words, when a data volume of the collected driving data is relatively small, or a current driving data collection task requires a relatively large amount of driving data, the vehicle side device may alternatively report all of the collected driving data to the network side device, to construct a driving database as soon as possible.

In another embodiment, if S205 is performed, the vehicle side device may send filtered partial data to the network side device. In this way, a data volume of the driving data that needs to be reported can be further reduced, thereby further improving data collection efficiency.

Alternatively, operation 206 may be replaced with the following operations: Store, in a removable storage medium, the driving data that is collected by the at least one sensor and that is determined by the vehicle side based on the driving scenario requirement information, that is, a target data set; connect the removable storage medium to the network side device; and the network side device obtains driving data in a driving scenario by reading the target data set stored in the removable storage medium.

In addition, different vehicles have different sensing capabilities. For example, a vehicle that is not provided with a light amount sensor may not have a capability of recognizing two scenarios: daytime and night. For another example, a vehicle that is not provided with a rainfall sensor may not have a capability of recognizing two scenarios: a rainy day and a sunny day. Therefore, further, the network side device may further simplify the driving scenario requirement information into driving requirement information that can be recognized by all or most vehicles, for example, a driving time and a driving place, to reduce dependency of the driving scenario requirement information on the vehicle sensing capability. Therefore, reliability and applicability of the driving data collection method are improved. The following uses a driving data collection method shown in FIG. 3 as an example for description.

For example, FIG. 3 is a second schematic flowchart of a driving data collection method according to an embodiment of this application. As shown in FIG. 3, the driving data collection method includes the following operations.

S301. A network side device determines driving scenario requirement information.

For a specific implementation, refer to S202. Details are not described herein again.

S302. The network side device simplifies the driving scenario requirement information into a driving time and a driving place.

For example, for a daytime driving scenario, a driving data collection time may be simplified to 9:00 to 17:00, to reduce dependency on an in-vehicle light amount sensor. For another example, for a driving scenario of an urban road, a driving data collection location may be set to GPS electronic fence coordinates corresponding to an urban road, to reduce dependency on sensors such as a camera and an event data recorder. In other words, by using the foregoing simplified operation, driving data may no longer depend on a driving scenario identification capability of a vehicle, but only needs to be collected based on a driving time and a driving place, and reported to the network side device. This can reduce a requirement on a capability of identifying different driving scenarios by a vehicle side device, and simplify operation complexity on the vehicle side, thereby improving adaptability and collection efficiency of the driving data collection method.

S303. The network side device sends the driving time and the driving place to the vehicle side device. Correspondingly, the vehicle side device receives the driving time and the driving place from the network side device.

For example, the network side device may send the driving time and the driving place to the vehicle side device in a wired or wireless manner. Correspondingly, the vehicle side device may receive the driving time and the driving place from the network side device in a wired or wireless manner. For specific implementation, refer to an existing implementation of communication between the network side device and the vehicle side device. Details are not described again in this embodiment of this application.

S304. The vehicle side device determines at least one sensor on a vehicle based on the driving time and the driving place.

For example, if the driving time is daytime, the at least one sensor may include a sensor that can collect a video signal or an optical signal, such as a camera, an event data recorder, or a light amount sensor. For another example, if the driving time is at night, the at least one sensor may include a millimeter-wave radar, an infrared camera, and the like. For another example, if the driving place is a high-speed road, the at least one sensor may include a sensor such as a camera, a millimeter-wave radar, or a laser radar. For another example, if the driving place is an urban road, the at least one sensor may include a sensor such as an ultrasonic radar.

S305. The vehicle side device determines partial data of driving data collected by the at least one sensor based on the driving time and the driving place.

For example, if the driving time is 9:00 to 17:00, the vehicle side device may report only driving data collected by an in-vehicle sensor during 9:00 to 17:00, and does not need to report driving data collected before 9:00 and after 17:00. For another example, if the driving place is an urban road, only driving data collected when the vehicle is located on the urban road needs to be reported, and driving data collected before the vehicle enters the urban road and after the vehicle leaves the urban road does not need to be reported.

S306. The vehicle side device sends, to the network side device, driving data collected by the at least one sensor. Correspondingly, the network side device receives, from the vehicle side device, the driving data collected by the at least one sensor.

Specifically, the vehicle side device may send, to the network side device, all of or the partial data of the driving data collected by the at least one sensor. When the partial driving data is reported, the partial driving data may be the partial driving data determined by using the method in S305, and/or may be determined based on a data reporting volume threshold, to avoid repeated reporting of a large amount of collected driving data of a same type. In addition, the vehicle side device may further add a driving time tag and a driving place tag to the reported driving data, so that the network side device identifies a driving scenario corresponding to the driving data, to simplify a driving data processing procedure of the network side device, thereby improving data processing efficiency. For specific implementations of the data reporting volume threshold, the driving time tag, and the driving place tag, refer to related descriptions of adding various tags in S205. Details are not described herein again.

In this embodiment of this application, the driving scenario requirement information may be sent by the network side device to the vehicle side device, as described in the methods shown in FIG. 2 and FIG. 3. Alternatively, the driving scenario requirement information may be prestored in the vehicle side device. The vehicle side device may determine, by itself, driving scenario requirement information corresponding to a current driving data collection task, and report collected driving data to the network side device based on the determined driving scenario requirement information. The following provides description with reference to FIG. 4.

For example, FIG. 4 is a third schematic flowchart of a driving data collection method according to an embodiment of this application. As shown in FIG. 4, the driving data collection method includes the following operations.

S401. A vehicle side device reads driving scenario requirement information prestored in the vehicle side device.

The driving scenario requirement information prestored in the vehicle side device may be received by a vehicle from a network side device earlier and stored in local storage space; may be prestored in local storage space of the vehicle side device in a vehicle manufacturing process; may be written into and stored in local storage space of the vehicle side device by using a maintenance interface of the vehicle in a sales or use process of the vehicle; or may be received by the vehicle-side device by using various driving service application programs (application, APP), such as navigation software from application servers of various driving service providers, and stored in a local cache of a vehicle side device. A specific source of the driving scenario requirement information prestored in the vehicle side device is not limited in this embodiment of this application.

In one embodiment, the driving scenario requirement information prestored in the vehicle side device may alternatively be a driving data collection parameter or a driving data collection parameter combination for a single driving scenario. Correspondingly, for a driving data collection task, a union set of actually confirmed driving data collection parameters or driving data collection parameter combinations corresponding to all single driving scenarios may be used as driving scenario requirement information of the driving data collection task.

Correspondingly, in S401, reading driving scenario requirement information pre-stored in a vehicle may be specifically implemented as follows: The vehicle side device uses, as the driving scenario requirement information based on one or more single driving scenarios currently recognized by a sensor of the vehicle side device, the union set of driving data collection parameters or driving data collection parameter combinations respectively corresponding to the one or more single driving scenarios that are prestored in the vehicle side device. In other words, an operation of determining the driving scenario requirement information based on one or more single driving scenarios may be performed by the vehicle side device.

In another embodiment, the driving scenario requirement information prestored in the vehicle side device may be driving data collection parameters or driving data collection parameter combinations separately for a plurality of driving scenario combinations. Correspondingly, for a driving data collection task, a driving data collection parameter or a driving data collection parameter combination corresponding to a driving scenario combination may be selected based on an actual driving data collection requirement as the driving scenario requirement information.

Correspondingly, in S401, reading driving scenario requirement information prestored in a vehicle side device may be specifically implemented as follows: The vehicle selects, based on a current driving scenario combination recognized by the sensor of the vehicle, one group of driving data collection parameters or parameter combinations prestored in the vehicle as the driving scenario requirement information.

In one embodiment, a plurality of groups of driving scenario requirement information that are in a one-to-one correspondence with a plurality of candidate scenario combinations may be preconfigured in the local storage space of the vehicle. The vehicle side device may select one group from the plurality of groups of driving scenario requirement information based on sensing capability information of the vehicle side device and a current scenario. In this way, information exchange between the vehicle side device and the network side device can be reduced, thereby improving data collection efficiency.

For a specific implementation in which the vehicle side device determines, based on a single scenario or a scenario combination, the driving scenario information corresponding to the current driving data collection task, refer to related operations of the network side device in S202. Details are not described herein again.

Further, the vehicle side device may determine, based on a sensing capability of the vehicle, requirement information of a driving scenario that can be supported by the vehicle side device. In this way, a case in which a driving data collection task cannot be completed due to a limited sensing capability of the vehicle can be avoided, thereby further improving driving data collection efficiency. It should be understood that if the sensing capability of the vehicle does not support driving data collection tasks corresponding to some or all driving scenario requirement information, the vehicle side device may send actual sensing capability information of the vehicle side device and/or indication information to the network side device. The indication information is used to indicate that the sensing capability of the vehicle does not support the driving data collection tasks corresponding to some or all of the driving scenario requirement information, so that the network side device selects, accordingly, a vehicle having a corresponding sensing capability, thereby further improving driving data collection efficiency.

S402. The vehicle side device determines at least one sensor on the vehicle based on the driving scenario requirement information.

S403. The vehicle side device determines partial data of driving data collected by the at least one sensor based on the driving scenario requirement information.

S404. The vehicle side device sends, to the network side device, driving data collected by the at least one sensor. Correspondingly, the network side device receives, from the vehicle side device, the driving data collected by the at least one sensor.

For specific implementations of S402 to S404, refer to related content in S204 to S206. Details are not described herein again.

It should be noted that the operations performed by the vehicle side device in S201 to S206, S301 to S306, and S401 to S404 may be performed by the following driving data collection apparatus 500 or the following driving data collection apparatus 700. The vehicle side device may be a vehicle, or may be a chip (system), an in-vehicle terminal, an in-vehicle module, an in-vehicle unit, or another component that can be disposed in a vehicle. Similarly, the operations performed by the network side device in S201 to S206, S301 to S306, and S401 to S404 may be performed by the driving data collection apparatus 600 or the following driving data collection apparatus 700. The network side device may be a network side server, a base station, a roadside unit RSU, a relay device, or a chip (system) or a component in the foregoing various devices. An execution body of the foregoing driving data collection method, regardless of an execution body on a vehicle side or an execution body on a network side, is not specifically limited in this embodiment of this application.

It should be noted that, in a process of performing the driving data collection method shown in any one of FIG. 2 to FIG. 4, after the driving data is reported to the network side device, the network side device may construct, by using the reported driving data, a training sample library used to train a vehicle driving algorithm. Alternatively, the driving data may be used for vehicle testing, fault diagnosis, or the like. A specific purpose of the driving data is not limited in this embodiment of this application.

Based on the driving data collection method shown in any one of FIG. 2 to FIG. 4, the vehicle may choose, based on the driving scenario requirement information, to report the driving data collected by the at least one sensor. For example, the vehicle may choose, based on the driving scenario requirement information, to report partial driving data collected by in-vehicle sensors, so that the vehicle can be prevented from reporting all driving data collected by all in-vehicle sensors in a full data reporting manner. This can reduce a data volume of driving data that needs to be collected and reported, thereby improving efficiency of driving data collection and reporting.

The foregoing specifically describes the driving data collection methods provided in embodiments of this application with reference to FIG. 2 to FIG. 4. The following specifically describes driving data collection apparatuses provided in embodiments of this application with reference to FIG. 5 to FIG. 7.

Figure 5:
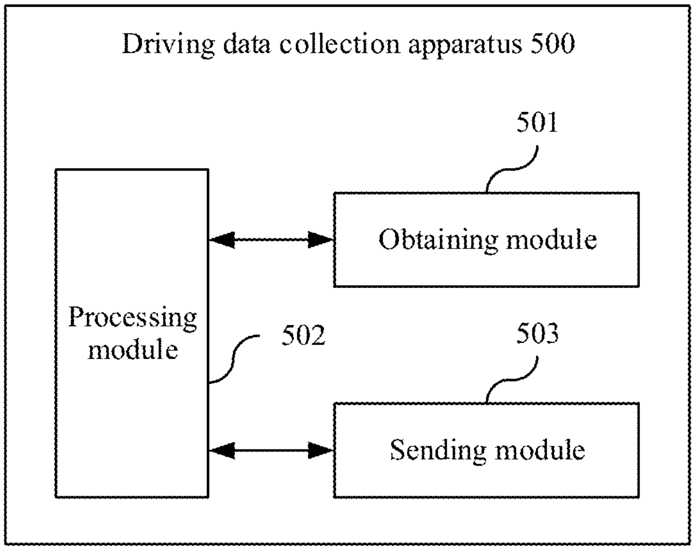
FIG. 5 is a first schematic diagram of a structure of a driving data collection apparatus according to an embodiment of this application.

For example, FIG. 5 is a first schematic diagram of a structure of a driving data collection apparatus according to an embodiment of this application. The driving data collection apparatus is applicable to the driving data collection system shown in FIG. 1, and perform the operations performed by the vehicle side device in the driving data collection method shown in any one of FIG. 2 to FIG. 4. For ease of description, FIG. 5 shows only main components of the driving data collection apparatus.

As shown in FIG. 5, the driving data collection apparatus 500 includes an obtaining module 501, a processing module 502, and a sending module 503.

The obtaining module 501 is configured to obtain driving scenario requirement information.

The processing module 502 is configured to determine at least one sensor on a vehicle based on the driving scenario requirement information.

The sending module 503 is configured to send driving data collected by the at least one sensor to a network side device.

In one embodiment, that the processing module 502 is configured to determine at least one sensor on a vehicle based on the driving scenario requirement information may include: The processing module 502 is configured to: before the sending module 503 sends, to the network side device, the driving data collected by the at least one sensor, determine, based on the driving scenario requirement information, partial data of driving data collected by the at least one sensor. Correspondingly, that the sending module 503 is configured to send, to a network side device, the driving data collected by the at least one sensor may include: The sending module 503 is configured to send the partial data to the network side device.

In one embodiment, that the obtaining module 501 is configured to obtain driving scenario requirement information may include: The obtaining module 501 is configured to receive the driving scenario requirement information from the network side device. In other words, the obtaining module 501 may be a receiving module.

In one embodiment, the sending module 503 is further configured to: before the driving scenario requirement information is received from the network side device, send sensing capability information of the vehicle to the network side device. Specifically, the sending module 503 is further configured to: before the driving scenario requirement information is received from the network side device, send the sensing capability information of the vehicle to the network side device. The sensing capability information is used by the network side device to determine the driving scenario requirement information.

In another embodiment, that the obtaining module 501 is configured to obtain driving scenario requirement information may include: The obtaining module 501 is configured to read driving scenario requirement information prestored in the vehicle. In other words, the obtaining module 501 may alternatively be a module having a processing function. In this case, the obtaining module 501 may be integrated with the processing module 502, or may be disposed independently. This is not specifically limited in this application.

In one embodiment, when the obtaining module 501 is a receiving module, the receiving module and the sending module 503 may be disposed independently, or may be integrated together, for example, integrated into one transceiver module (not shown in FIG. 5). When disposed independently, the sending module 503 is configured to send, by the driving data collection apparatus 500, a signal to another driving data collection apparatus, for example, another driving data collection apparatus or the network side device. The receiving module is configured to receive, by the driving data collection apparatus 500, a signal from the another driving data collection apparatus, for example, another driving data collection apparatus or the network side device.

In one embodiment, the driving data that is collected by the at least one sensor and that is sent to the network side device is driving data to which a tag related to the driving scenario requirement information is added. Specifically, the processing module 502 is further configured to: before the sending module 503 sends the driving data to the network side device, add a tag to the driving data based on a driving scenario requirement.

In one embodiment, the driving data collection apparatus 500 may further include a storage module (not shown in FIG. 5), and the storage module stores a program or instructions. When the processing module 502 executes the program or the instructions, the driving data collection apparatus 500 is enabled to perform a function of the vehicle in the driving data collection method described in any one of the foregoing method embodiments.

It should be noted that the driving data collection apparatus 500 may be a vehicle, or an in-vehicle terminal, an in-vehicle module, or an in-vehicle unit that may be disposed in a vehicle, or may be a chip (system) or another part or component that may be disposed in a vehicle, an in-vehicle terminal, tan in-vehicle module, or an in-vehicle unit. This is not limited in this embodiment of this application.

In addition, for a technical effect of the driving data collection apparatus 500, refer to the technical effect of the driving data collection method described in the foregoing method embodiment. Details are not described herein again.

Figure 6:
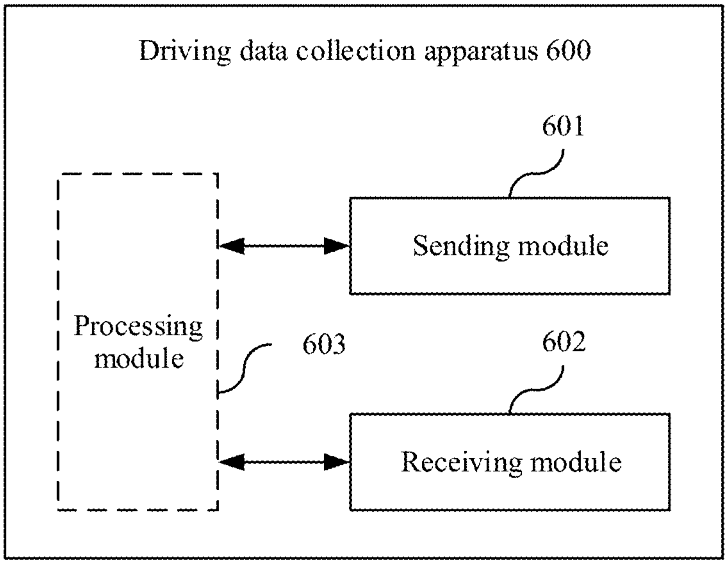
FIG. 6 is a second schematic diagram of a structure of a driving data collection apparatus according to an embodiment of this application.

For example, FIG. 6 is a second schematic diagram of a structure of a driving data collection apparatus according to an embodiment of this application. The driving data collection apparatus is applicable to the driving data collection system shown in FIG. 1, and perform the operations performed by the network side device in the driving data collection method shown in any one of FIG. 2 to FIG. 4. For ease of description, FIG. 6 shows only main components of the driving data collection apparatus.

As shown in FIG. 6, a driving data collection apparatus 600 includes a sending module 601 and a receiving module 602.

The sending module 601 is configured to send driving scenario requirement information to a vehicle, and the driving scenario requirement information is used by the vehicle to determine at least one sensor on the vehicle.

The receiving module 602 is configured to receive, from the vehicle, driving data collected by the at least one sensor.

In one embodiment, the driving scenario requirement information is further used to determine partial data of driving data collected by the at least one sensor. Correspondingly, that the receiving module 602 is configured to receive, from the vehicle, driving data collected by the at least one sensor may include: The receiving module 602 is configured to receive the partial data from the vehicle.

In one embodiment, the driving data collection apparatus 600 further includes a processing module 603 (shown in a dashed box in FIG. 6). The receiving module 602 is further configured to receive sensing capability information of the vehicle from the vehicle. Specifically, the receiving module 602 is further configured to receive the sensing capability information of the vehicle from the vehicle before the driving scenario requirement information is sent to the vehicle. Correspondingly, the processing module 603 is configured to determine the driving scenario requirement information based on the sensing capability information.

In one embodiment, the driving data may further include a tag related to the driving scenario requirement information.

In one embodiment, the sending module 601 and the receiving module 602 may be disposed separately, or may be integrated together, for example, may be integrated into one transceiver module. This is not specifically limited in this embodiment of this application.

In one embodiment, the driving data collection apparatus 600 may further include a storage module (not shown in FIG. 6), and the storage module stores a program or instructions. When the processing module 603 executes the program or the instructions, the driving data collection apparatus 600 is enabled to perform a function of the network side device in the driving data collection method described in any one of the foregoing method embodiments.

It should be noted that the driving data collection apparatus 600 may be a network side device such as a server, or may be a chip (system) or another part or component that can be disposed in the network side device. This is not limited in this embodiment of this application.

In addition, for a technical effect of the driving data collection apparatus 600, refer to the technical effect of the driving data collection method described in the foregoing method embodiment. Details are not described herein again.

It should be understood that one or more of the modules shown in FIG. 5 and FIG. 6 may be implemented by software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC).

Figure 7:
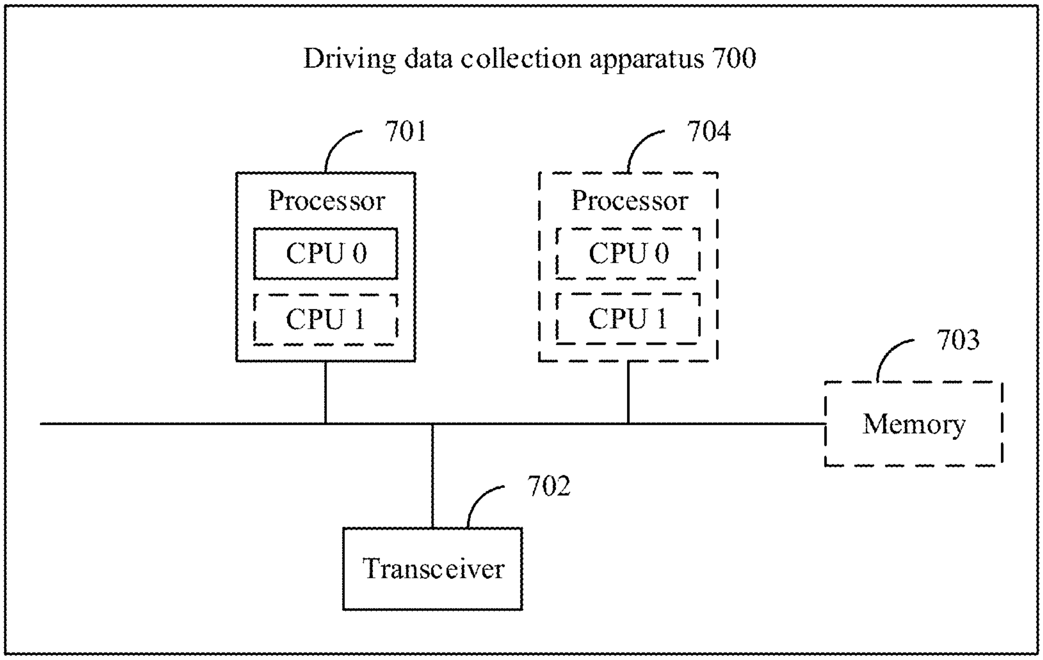
FIG. 7 is a third schematic diagram of a structure of a driving data collection apparatus according to an embodiment of this application.

For example, FIG. 7 is a third schematic diagram of a structure of a driving data collection apparatus according to an embodiment of this application. The driving data collection apparatus is applicable to the driving data collection system shown in FIG. 1, and perform the operations performed by the vehicle side device or the network side device in the driving data collection method shown in any one of FIG. 2 to FIG. 4. For example, the driving data collection apparatus may be the foregoing network side device or vehicle, or may be a chip (system) or another part or component that may be disposed inside the network side device or the vehicle. For another example, the driving data collection apparatus may alternative be the foregoing driving data collection apparatus 500 or driving data collection apparatus 600. This is not specifically limited in this embodiment of this application.

As shown in FIG. 7, the driving data collection apparatus 700 may include a processor 701 and a transceiver 702. In one embodiment, the driving data collection apparatus 700 may include a memory 703. The processor 701 is coupled to the transceiver 702 and the memory 703, for example, may be connected by using a communications bus.

The following describes each component of the driving data collection apparatus 700 in detail with reference to FIG. 7.

The processor 701 is a control center of the driving data collection apparatus 700, and may be one processor, or may be a collective term of a plurality of processing elements. For example, the processor 701 is one or more central processing units (CPU), may be an application specific integrated circuit (ASIC), or may be one or more integrated circuits configured to implement embodiments of this application, for example, one or more digital signal processors (DSP), or one or more field programmable gate arrays (FPGA).

In one embodiment, the processor 701 may perform various functions of the driving data collection apparatus 700 by running or executing a software program stored in the memory 703 and invoking data stored in the memory 703.

In specific implementation, in an embodiment, the processor 701 may include one or more CPUs, for example, a CPU 0 and a CPU 1 shown in FIG. 7.

During specific implementation, in an embodiment, the driving data collection apparatus 700 may alternatively include a plurality of processors, for example, the processor 701 and a processor 704 shown in FIG. 7. Each of the processors may be a single-core processor (single-CPU) or may be a multi-core processor (multi-CPU). The processor herein may be one or more communication devices, circuits, and/or processing cores configured to process data (for example, computer program instructions).

The transceiver 702 is configured to communicate with another driving data collection apparatus. For example, referring to FIG. 1, the driving data collection apparatus 700 is a vehicle, and the transceiver 702 may be configured to communicate with a network side device, or communicate with another vehicle. For another example, the driving data collection apparatus 700 is a network side device, and the transceiver 702 may be configured to communicate with a vehicle, or communicate with another network side device.

In one embodiment, the transceiver 702 may include a receiver and a transmitter (not separately shown in FIG. 7). The receiver is configured to implement a receiving function, and the transmitter is configured to implement a sending function.

In one embodiment, the transceiver 702 may be integrated with the processor 701, or may exist independently, and is coupled to the processor 701 by using an input/output port (not shown in FIG. 7) of the driving data collection apparatus 700. This is not specifically limited in this embodiment of this application.

The memory 703 may be configured to store a software program for executing the solutions of this application, and the processor 701 controls the execution of the software program. For a specific implementation, refer to the following method embodiments. Details are not described herein again.

The memory 703 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc), a magnetic disk storage medium or another magnetic storage device, or any other medium that can be used to carry or store expected program code in a form of instructions or a data structure and that can be accessed by a computer. This is not limited in embodiments of this application. It should be noted that the memory 703 may be integrated with the processor 701, or may exist independently, and is coupled to the processor 701 by using an input/output port (not shown in FIG. 7) of the driving data collection apparatus 700. This is not specifically limited in this embodiment of this application.

It should be noted that a structure of the driving data collection apparatus 700 shown in FIG. 7 does not constitute a limitation on an implementation of the driving data collection apparatus. An actual driving data collection apparatus may include more or fewer components than those shown in the figure, or combine some components, or have different component arrangements.

An embodiment of this application provides a vehicle. The vehicle includes the driving data collection apparatus 500 or the driving data collection apparatus 700.

An embodiment of this application provides a network side device. The network side device includes the driving data collection apparatus 600 or the driving data collection apparatus 700.

An embodiment of this application provides a driving data collection system. The system includes a vehicle and a network side device.

An embodiment of this application provides a computer readable storage medium, including computer instructions. When the computer instructions are run by a processor, the driving data collection apparatus is enabled to perform the driving data collection method in the foregoing method embodiment.

An embodiment of this application provides a computer program product. When the computer program product runs on a processor, the driving data collection apparatus is enabled to perform the driving data collection method in the foregoing method embodiment.

It should be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (rRAM), used as an external cache. Through an example rather than a limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented using software, hardware (for example, circuit), firmware, or any combination thereof. When software is used to implement embodiments, the foregoing embodiments may be implemented in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and indicates that three relationships may exist. For example, A and/or B may indicate the following three cases: only A exists, both A and B exist, and only B exists. A and B may be singular or plural. In addition, the character "/" in this specification usually indicates an "or" relationship between the associated objects, or may indicate an "and/or" relationship. A specific meaning depends on a context.

In this application, at least one means one or more, and a plurality of means two or more. "At least one of the following" or a similar expression thereof refers to any combination of these items, including any combination of a single item or a plural item. For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A driving data collection apparatus, comprising:

at least one processor; and at least one memory storing program instructions, wherein the at least one processor is coupled to the at least one memory to execute the instructions to:

transmit, to a network side device, sensing capability information of a vehicle comprising types of available in-vehicle sensors and their sensing capabilities utilized by the network side device to determine a driving scenario requirement that indicates at least a collection time interval and a collection geographic region, and also comprises at least one of road information or environment information;

obtain, from the network side device, information indicating the driving scenario requirement;

select, based on the driving scenario requirement, at least one in-vehicle sensor from a plurality of in-vehicle sensors, wherein the at least one in-vehicle sensor is fewer than all of the plurality of in-vehicle sensors, and wherein the at least one in-vehicle sensor is selected by mapping the at least one of road information or environment information to sensing capabilities of the plurality of in-vehicle sensors;

transmit, to the network side device, a target data set constructed on the vehicle based on a first part of driving data collected by the at least one in-vehicle sensor during the collection time interval and within the collection geographic region, wherein the target data set comprises a tag related to the driving scenario requirement; and prevent, during the collection time interval corresponding to the driving scenario requirement, from transmitting a second part of driving data collected by one of the plurality of in-vehicle sensors other than the selected at least one in-vehicle sensor on the vehicle.

2. The driving data collection apparatus according to claim 1, wherein data in the target data set is only the first part of the driving data collected by the selected at least one in-vehicle sensor.

3. The driving data collection apparatus according to claim 1, wherein the at least one processor is coupled to the at least one memory to execute the instructions to:

store the target data set in a removable storage medium.

4. The driving data collection apparatus according to claim 1, wherein the at least one in-vehicle sensor is determined based on the information indicating the driving scenario requirement.

5. A driving data collection apparatus, comprising:

at least one processor; and at least one memory storing program instructions, and wherein the at least one processor is coupled to the at least one memory to execute the instructions to:

receive, from a vehicle, sensing capability information of the vehicle comprising types of available in-vehicle sensors and their sensing capabilities to determine a driving scenario requirement that indicates at least a collection time interval and a collection geographic region;

transmit, to the vehicle, information indicating the driving scenario requirement comprising at least one of road information or environment information; and obtain a target data set constructed based on a first part of driving data collected on the vehicle by at least one sensor on the vehicle, selected by the vehicle by mapping the at least one of road information or environment information to sensing capabilities of the plurality of in-vehicle sensors, during the collection time interval and within the collection geographic region, wherein the target data set comprises a tag related to the driving scenario requirement; and prevent, during the collection time interval corresponding to the driving scenario requirement, from receiving a second part of driving data collected by a sensor other than the selected at least one sensor on the vehicle.

6. The driving data collection apparatus according to claim 5, wherein, the at least one processor is coupled to the at least one memory to execute the instructions to:

transmit, to the vehicle, the information indicating the driving scenario requirement based on the sensing capability information.

7. A method of collecting driving data, applied to a vehicle, comprising:

transmitting, to a network side device, sensing capability information of the vehicle comprising types of available in-vehicle sensors and their sensing capabilities utilized by the network side device to determine a driving scenario requirement that indicates at least a collection time interval and a collection geographic region, and also comprises at least one of road information or environment information;

obtaining, from the network side device, information indicating the driving scenario requirement;

selecting, based on the driving scenario requirement, at least one in-vehicle sensor from a plurality of in-vehicle sensors, wherein the at least one in-vehicle sensor is fewer than all of the plurality of in-vehicle sensors, and wherein the at least one in-vehicle sensor is selected by mapping the at least one of road information or environment information to sensing capabilities of the plurality of in-vehicle sensors;

transmitting, to the network side device, a target data set constructed on the vehicle based on a first part of driving data collected by the at least one in-vehicle sensor during the collection time interval and within the collection geographic region, wherein the target data set comprises a tag related to the driving scenario requirement; and preventing, during the collection time interval corresponding to the driving scenario requirement, from transmitting a second part of driving data collected by one of the plurality of sensors other than the selected at least one in-vehicle sensor on the vehicle.

8. The driving data collection method according to claim 7, wherein data in the target data set is only the first part of the driving data collected by the selected at least one in-vehicle sensor.

9. The driving data collection method according to claim 7, wherein the at least one in-vehicle sensor is determined based on the information indicating the driving scenario requirement.

* * * * *